(12) United States Patent
Baik

(10) Patent No.: US 9,105,133 B2
(45) Date of Patent: Aug. 11, 2015

(54) MULTI VIEW IMAGE DISPLAY APPARATUS AND CONTROL METHOD THEREOF

(71) Applicant: SAMSUNG ELECTRONICS CO., LTD., Suwon-si (KR)

(72) Inventor: Aron Baik, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/313,006

(22) Filed: Jun. 24, 2014

(65) Prior Publication Data

US 2015/0116312 A1   Apr. 30, 2015

(30) Foreign Application Priority Data

Oct. 31, 2013   (KR) .................. 10-2013-0131183

(51) Int. Cl.
| | |
|---|---|
| G06T 15/00 | (2011.01) |
| G06T 19/20 | (2011.01) |
| G06T 7/00 | (2006.01) |
| G06T 15/20 | (2011.01) |
| G06T 17/00 | (2006.01) |
| G06T 17/20 | (2006.01) |
| G06T 15/10 | (2011.01) |
| G06T 19/00 | (2011.01) |

(52) U.S. Cl.
CPC ............... *G06T 19/20* (2013.01); *G06T 7/0051* (2013.01); *G06T 15/205* (2013.01); *G06T 15/00* (2013.01); *G06T 15/10* (2013.01); *G06T 17/00* (2013.01); *G06T 17/20* (2013.01); *G06T 19/00* (2013.01)

(58) Field of Classification Search
CPC ......... G06T 19/00; G06T 17/20; G06T 17/00; G06T 15/10; G06T 15/00
USPC ............. 345/419, 6, 629, 427, 592, 619, 582, 345/204; 382/104, 154, 103, 254, 294, 106; 348/42, 51, 43, 47, 139, 36
See application file for complete search history.

(56) References Cited

U.S. PATENT DOCUMENTS

| | | | |
|---|---|---|---|
| 6,125,198 A * | 9/2000 | Onda | 382/154 |
| 8,019,146 B2 | 9/2011 | Koo et al. | |

(Continued)

FOREIGN PATENT DOCUMENTS

| | | |
|---|---|---|
| EP | 2444936 A2 | 4/2012 |
| EP | 2466903 A2 | 6/2012 |

(Continued)

OTHER PUBLICATIONS

Extended European Search Report dated Jun. 10, 2015 issued by the European Patent Office for European Patent Application No. 14160582.4.

*Primary Examiner* — Abderrahim Merouan
(74) *Attorney, Agent, or Firm* — Sughrue Mion, PLLC

(57) ABSTRACT

A multi view image display apparatus is provided. The multi view image display apparatus includes: a depth adjuster configured to adjust a depth of an input image; a renderer configured to render a multi view image based on the input image of which depth is adjusted; a display configured to arrange a multi view image in a preset arrangement pattern in order to display the multi view image; and a controller configured to control the depth adjuster to shift the depth of the input image based on depth information related to at least one object of the input image so that an object satisfying a preset criteria has a preset depth value.

19 Claims, 12 Drawing Sheets

(56) References Cited

U.S. PATENT DOCUMENTS

| | | | |
|---|---|---|---|
| 8,045,792 B2 | 10/2011 | Koo et al. | |
| 8,228,327 B2 * | 7/2012 | Hendrickson et al. | 345/420 |
| 8,373,745 B2 * | 2/2013 | Masuda et al. | 348/46 |
| 2005/0089212 A1 * | 4/2005 | Mashitani et al. | 382/154 |
| 2008/0240549 A1 * | 10/2008 | Koo et al. | 382/154 |
| 2010/0208994 A1 * | 8/2010 | Yao et al. | 382/173 |
| 2011/0018966 A1 * | 1/2011 | Kitazato | 348/43 |
| 2011/0292178 A1 * | 12/2011 | Goma et al. | 348/46 |
| 2011/0304708 A1 | 12/2011 | Ignatov | |
| 2012/0133748 A1 * | 5/2012 | Chung et al. | 348/51 |
| 2012/0176371 A1 * | 7/2012 | Morifuji et al. | 345/419 |
| 2012/0257013 A1 * | 10/2012 | Witt et al. | 348/43 |
| 2012/0300035 A1 * | 11/2012 | Okamoto | 348/46 |
| 2012/0327197 A1 * | 12/2012 | Yamashita et al. | 348/50 |
| 2013/0070052 A1 * | 3/2013 | Yamashita et al. | 348/43 |
| 2013/0093849 A1 * | 4/2013 | He et al. | 348/43 |
| 2013/0251241 A1 * | 9/2013 | Kunkel et al. | 382/154 |
| 2014/0111627 A1 * | 4/2014 | Ishigami | 348/51 |

FOREIGN PATENT DOCUMENTS

| | | |
|---|---|---|
| EP | 2557537 A1 | 2/2013 |
| KR | 10-2008-0088305 A | 10/2008 |
| KR | 10-0924432 B1 | 10/2009 |
| KR | 10-2011-0033007 A | 3/2011 |
| WO | 2012/156489 A1 | 11/2012 |

* cited by examiner

MULTI VIEW IMAGE DISPLAY APPARATUS AND CONTROL METHOD THEREOF

CROSS-REFERENCE TO RELATED APPLICATION(S)

This application claims priority from Korean Patent Application No. 10-2013-0131183, filed on Oct. 31, 2013, in the Korean Intellectual Property Office, the disclosure of which is incorporated herein by reference, in its entirety.

BACKGROUND

1. Technical Field

Aspects of the exemplary embodiments generally relate to providing a multi view image display apparatus and a control method thereof. More particularly, the exemplary embodiments relate to providing a glassless multi view image display apparatus and a control method thereof.

2. Description of the Related Art

As electronic technologies are developed, various types of electronic devices have been developed and have been widely distributed. In particular, a display apparatus, such as a TV that is one of the most commonly used home appliances, has rapidly developed in the past several years.

As a display apparatus has a high level of performance, types of contents displayed on the display apparatus have variously increased. In particular, a stereoscopic display system through which 3-dimensional (3D) contents may be viewed has been developed and distributed.

The stereoscopic display system may be classified into a glass type system and a glassless system, according to whether 3D image viewing glasses are used.

As an example of the glass type system, there is a shutter glass type display apparatus. The shutter glass type system refers to a system that alternately outputs left and right eye images and alternately opens and closes left and right shutter glasses of 3D glasses that a user wears, together with the alternately outputting of the left and right eye images, in order to provide a 3D effect to a user.

The glassless system is also referred to as an autostereoscopic system. A glassless 3D display apparatus displays an optically divided multi view image and projects different view images to left and right eyes of the user by using a parallax barrier technology or a lenticular lens in order to provide a 3D effect to the user.

The number of views supported by a glassless 3D display varies, but views between about 7 and about 9 are supported. However, since there are not many contents having many photographing views, and the number of views necessary for a 3D display varies, and a format converter for converting a content captured into a general format into a format supported in the 3D display is required. The most general format is stereo in 3D. The format converter generates the number of views appropriate for an output display by using an input stereo image. In order to perform this work, t a stereo matching (or disparity estimating) work for calculating a pixel correspondence between a pair of stereo images and a rendering work for generating the number of views necessary for a display by using a calculated disparity image and an input image, are required. In brief, a pixel is shifted by an amount proportional to a distance between an input view and an estimated disparity so as to generate a multi view.

Since such a pixel shift amount is directly related to a depth recognition of a human, there is a need for a method of appropriately controlling an amount of a pixel shift to improve display performance.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a multi view image display apparatus that adjusts a depth to optimize a 3-dimensional (3D) effect perceived by a user in order to render a multi view image, and a control method thereof.

According to an aspect of the exemplary embodiments, there is provided a multi view image display apparatus including: a depth estimator configured to estimate a depth of an input image; a depth adjuster configured to adjust the estimated depth; a renderer configured to render a multi view image based the adjusted depth; and a display configured to display the multi view image. The depth adjuster may adjust the estimated depth based on at least one of information calculated from a disparity histogram of the input image, periodic pattern information existing in the input image, and Markov random fields (MRF) information of the input image.

The depth adjuster may adjust the estimated depth in order to reduce the estimated depth based on at least one of the information calculated from the disparity histogram of the input image, the periodic pattern information existing in the input image, and the MRF energy information of the input image.

The information calculated from the disparity histogram of the input image may be threshold frequency information which corresponds to an edge area of a disparity search range in which a disparity is detected from the disparity histogram. In response to the threshold frequency information exceeding a preset threshold value, the depth adjuster may adjust the adjusted depth in order to reduce the estimated depth.

The periodic pattern information existing in the input image may be periodic pattern frequency information for estimating an amount of a periodic or repetitive texture existing in the input image. In response to the periodic pattern frequency information exceeding a preset threshold value, the depth adjuster may adjust the estimated depth in order to reduce the estimated depth.

The MRF energy information of the input image may include information related to energy that quantifies a matching degree of a stereo image which constitutes the input image. In response to the MRF energy information exceeding a preset threshold value, the depth adjuster may adjust the estimated depth in order to reduce the estimated depth.

The depth adjuster may convert a threshold frequency calculated from the disparity histogram, a periodic pattern frequency of a periodic pattern existing in the input image, and MRF energy of the input image, into attenuation coefficients, determine a minimum value of the attenuation coefficients as a depth reduction amount, and adjust the depth of the input image based on the determined depth reduction amount.

The depth adjuster may adjust a pixel shift amount for rendering the multi view image.

The depth adjuster may calculate the pixel shift amount for rendering the multi view image based on Equation below:

$$\rho = \rho_{max} \alpha \beta \frac{(d - d_{offset})}{d_{span}}$$

wherein p denotes a pixel shift amount occurring in a view that is generated to correspond to a disparity, d denotes a local disparity of a disparity image, p_max denotes a maximum screen parallax, and d_span and d_offset are values calculated from the disparity histogram, β denotes a minimum value of the threshold frequency, a periodic pattern frequency, and MRF energy, and α denotes a view distance that is normalized from a center so that a distance between leftmost and rightmost images is 1.

According to another aspect of the exemplary embodiments, a method of controlling a multi view image display apparatus is provided. The method may include: estimating a depth of an input image; adjusting the estimated depth based on at least one of information calculated from a disparity histogram of the input image, periodic pattern information existing in the input image, and MRF energy information of the input image; rendering a multi view image based on the adjusted depth; and displaying the multi view image.

The depth of the input image may be adjusted to be reduced based on at least one of the information calculated from the disparity histogram of the input image, the periodic pattern information existing in the input image, and the MRF energy information of the input image.

The information calculated from the disparity histogram of the input image may be threshold frequency information which corresponds to an edge area of a disparity search range in which a disparity is detected from the disparity histogram. In response to the threshold frequency information exceeding a preset threshold value, the adjusted depth may be adjusted so as to be reduced.

The periodic pattern information existing in the input image may be periodic pattern frequency information to estimate an amount of a periodic or repetitive texture existing in the input image. In response to the periodic pattern frequency information exceeding a preset threshold value, the estimated depth may be adjusted so as to be reduced.

The MRF energy information of the input image may be information related to energy that quantifies a matching degree of a stereo image which constitutes the input image. In response to the MRF energy information exceeding a preset threshold value, the estimated depth may be adjusted so as to be reduced.

The adjusting of the estimated depth may include: converting a threshold frequency calculated from the disparity histogram, a periodic pattern frequency of a periodic pattern existing in the input image, MRF energy of the input image into attenuation coefficients, determining a minimum value of the attenuation coefficients as a depth reduction amount, and adjusting the depth of the input image based on the amount of the determined depth reduction.

The adjusting of the estimated depth may include: adjusting a pixel shift amount to render the multi view image.

The pixel shift amount for rendering the multi view image may be calculated based on the Equation below:

$$p = p_{max} \alpha \beta \frac{(d - d_{offset})}{d_{span}}$$

wherein p denotes a pixel shift amount occurring in a view that is generated to correspond to a disparity, d denotes a local disparity of a disparity image, p_max denotes a maximum screen parallax, d_span and d_offset are values calculated from the disparity histogram, β denotes a minimum value of the threshold frequency, a periodic pattern frequency, and a minimum value of MRF energy, and α denotes a view distance that is normalized from a center so that a distance between leftmost and rightmost images is 1.

An aspect of the exemplary embodiments may provide a multi view image display apparatus including: a depth adjuster configured to adjust an estimated depth of an input image; and a renderer configured to render a multi view image based on the adjusted estimated depth; wherein the depth adjuster is configured to adjust the estimated depth to reduce the estimated depth based on a minimum value of at least one of information calculated from a disparity histogram of the input image, periodic pattern information existing in the input image, and Markov random fields (MRF) information of the input image.

The multi view image display apparatus may further include a display configured to display the rendered multi view image.

The multi view image display apparatus may further provide a depth estimator configured to estimate the depth of the input image.

The information calculated from the disparity histogram of the input image may be threshold frequency information which corresponds to an edge area of a disparity search range in which a disparity is detected from the disparity histogram, wherein in response to the threshold frequency information exceeding a preset threshold value, the depth adjuster adjusts the adjusted depth in order to reduce the estimated depth.

The adjusting of the estimated depth may include adjusting an amount of pixel shift for rendering the multi view image. According to various exemplary embodiments, a glassless 3D display apparatus may provide a user with an optimum 3D effect.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
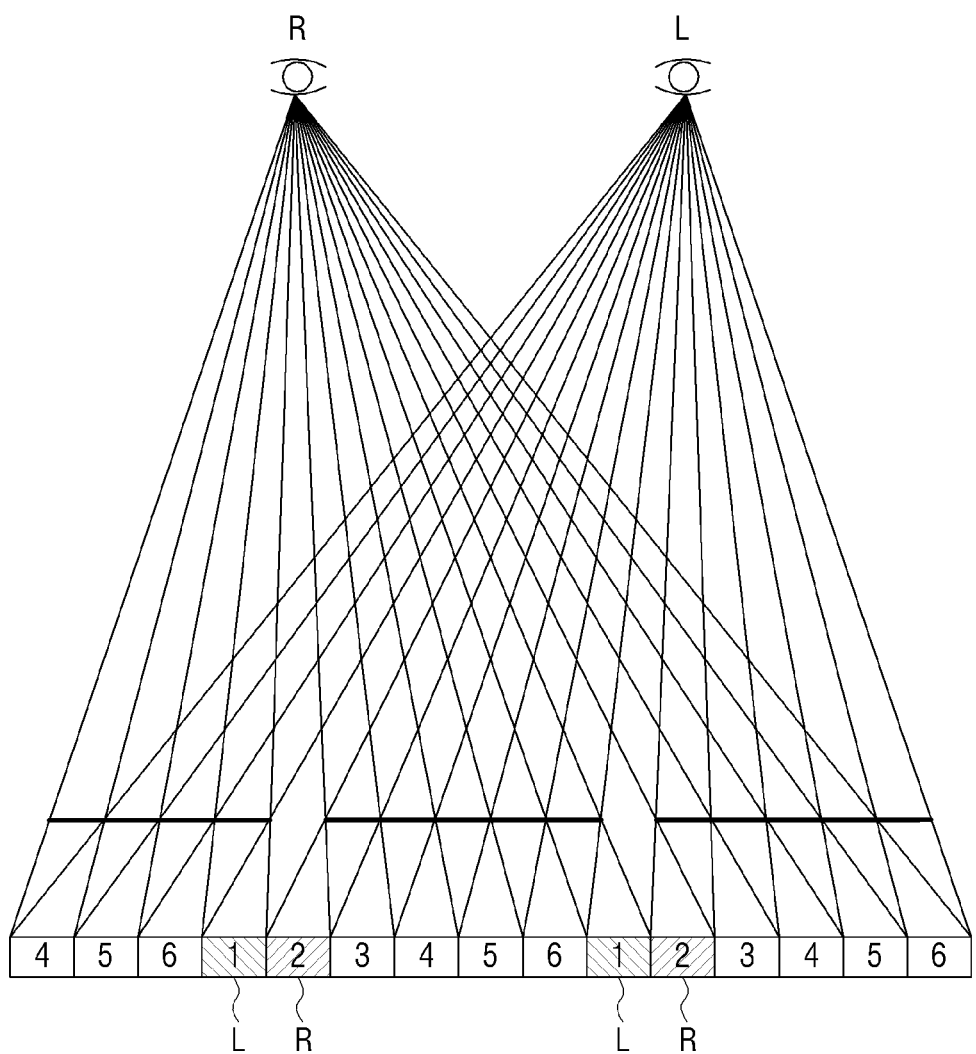
FIG. 1 is a view which illustrates an operation of a glassless 3-dimensional (3D) display apparatus, according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a view illustrating an operation of a glassless 3-dimensional (3D) display apparatus according to an exemplary embodiment.

FIG. 1 illustrates a method of operating an apparatus that displays a multi view image in order to provide a stereoscopic image, according to a glassless method. The multi view image includes a plurality of images that are generated by capturing an object at different angles. In other words, a plurality of images that are captured in different views are refracted at different angles, and an image focused in a position (for example, about 3 m) keeping a preset distance called a viewing distance, is provided. The position in which the image is formed is referred to as a viewing area. Therefore, in response to one eye of a user being positioned in a first viewing area and the other eye of the user is positioned in a second viewing area, the user experiences a 3D effect.

For example, FIG. 1 is a view which illustrates a display operation of a multi view image having a total of six views. Referring to FIG. 1, the glassless 3D display apparatus may project light which corresponds to an image having first one of the six views into the left eye and may project light which corresponds to an image having a second view into the right eye. Therefore, the user may view different view images with the left and right eyes in order to experience a 3D effect. However, this is only an exemplary embodiment, and an image having various views such as seven views, nine views, or the like, may be provided.

Figure 2:
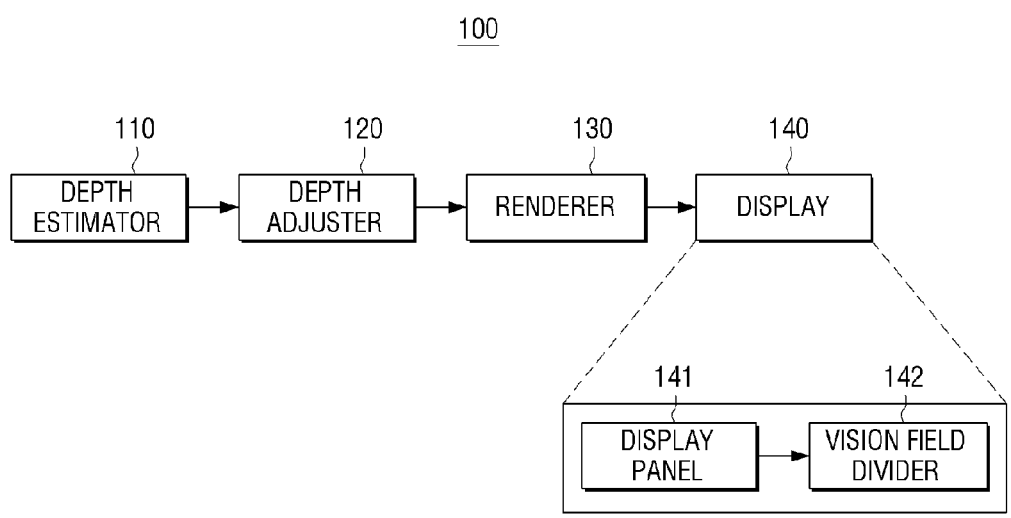
FIG. 2 is a block diagram which illustrates a structure of a multi view image display apparatus, according to an exemplary embodiment.

FIG. 2 is a block diagram which illustrates a multi view image display apparatus 100 according to an exemplary embodiment.

Referring to FIG. 2, the multi view image display apparatus 100 includes a depth estimator 110, a depth adjuster 120, a renderer 130, and a display 140.

The multi view image display apparatus 100 may be implemented as various types of display apparatuses such as a TV, a monitor, a personal computer (PC), a kiosk PC, a tablet PC, an electronic frame, a portable phone, etc.

An image input unit (not shown) receives various types of images. In particular, the image input unit may receive an image and depth information of the image from various types of external apparatuses, such as an external storage medium, a broadcasting station, a web server, etc. The input image is one of a single view image, a stereoscopic image, and a multi view image. The singe view image is an image that is captured by a general photographing apparatus. The stereoscopic image is a 3D video image that is expressed with only left and right eye images and is captured by a stereoscopic photographing apparatus. In general, the stereo photographing apparatus is a photographing apparatus which includes two lenses and is used to capture a stereoscopic image. The multi view image refers to a 3D video image that geometrically corrects images captured through one or more photographing apparatuses and spatially synthesizes the images to provide a user with various views of several directions.

The image input unit may receive depth information related to an image. In general, a depth of the image refers to a depth value allocated to each pixel of the image, For example, depth of 8 bit may have a gray scale value between 0 and 255. For example, in response to the depth being expressed based on black and white, a black color (a low value) may represent a place that is distant from a viewer, and a white color (a high value) may represent a place that is close to the viewer.

Hereinafter, for convenience of description, a stereo image may be input, and additional depth information may not be input.

The depth estimator 110 extracts depth information of an object which exists in an image based on an input stereo image, i.e., left and right eye images. The depth information indicates 3D distance information which exists in the image and may be referred to as a depth map (or a disparity map) or a depth image (or a disparity image). For example, the depth information refers to information which indicates information related to a 3D effect, such as a distance between a subject and a camera, a distance between the subject and a recording medium on which an image of the subject is focused, etc. In other words, in response to a distance between corresponding points of the left and right eye images being large, the 3D effect is further increased by the distance. The depth map forms a change state of such a depth as one image and may be represented as a gray level that varies according to a size of a distance between matching points of the left and right eye images. For example, a part brightly represented in the depth map corresponds to a part in which a distance between the camera and an object is close, and a part darkly represented in the depth map corresponds to a part in which the distance between the camera and the object is distant.

The depth estimator 110 may perform a stereo matching work for detecting matching points of the left and right eye images to extract distance information on a 3D space in order to generate the depth. The depth estimator 110 may apply an adaptive weight to perform the stereo matching work.

For example, since the left and right eye images are generated by capturing one subject at different views, an image difference may occur due to a difference between the views. For example, an edge part and a background part may overlap each other in the left eye image but may be slightly apart from each other in the right eye image. Therefore, an adaptive weight where weights of pixels having pixel values within a preset range based on the subject are enhanced may be applied, and weights of pixels having pixel values out of the preset range are lowered. Therefore, the adaptive weight may be applied to each of the left and right eye images, and then the application results may be compared to determine whether the left and right eye images are matched. In response to the adaptive weight being used as described above, a correct correspondence of the left and right eye images may be prevented from being determined that the correct correspondence has a low correlation, and thus, matching accuracy may be improved.

Although not shown in FIG. 2, the multi view image display apparatus 100 may further include a down-scalar (not shown) that reduces an operation burden for generating a depth map. In other words, the down-scalar may scale down an image received through an image receiver (not shown) and may provide the down-scaled image to the depth estimator 110 in order to reduce operational burden.

However, in response to depth information being input along with the image as described, a function performed by the depth estimator 110 may be omitted.

The depth adjuster 120 adjusts a depth estimated by the depth estimator 110.

In particular, the depth adjuster 120 controls a pixel shift amount for rendering a multi view image based on at least one of information calculated from a disparity histogram of an input image, periodic pattern information existing in the input image, and Markov random fields (MRF) energy information of the input image. The information calculated from the disparity histogram of the input image may be threshold frequency information which corresponds to an edge area of a disparity search range in which a disparity is detected in the disparity histogram. In this case, in response to a threshold frequency exceeds a preset threshold value; the depth adjuster 120 may adjust the estimated depth in order to reduce the estimated depth.

The periodic pattern information existing in the input image may be periodic pattern frequency information to estimate an amount of a periodic or repetitive texture existing in the input image. In response to a periodic pattern frequency exceeding a preset threshold value, the depth adjuster 120 may adjust the estimated depth in order to reduce the estimated depth.

The MRF energy information of the input image may be information related to energy for quantifying a matching degree of a stereo image which constitutes the input image. In response to MRF energy exceeding a preset threshold value, the depth adjuster 120 may adjust the estimated depth in order to reduce the estimated depth.

The depth adjuster 120 may convert threshold frequency information calculated from the disparity histogram, the periodic pattern frequency of a periodic pattern existing in the input image, and the MRF energy of the input image into attenuation coefficients, determine a minimum value of the attenuation coefficients as a depth reduction amount, and adjust the estimated depth based on the determined depth reduction amount. This will be described later with reference to the drawings.

The renderer 130 may render the depth adjusted by the depth adjuster 120, i.e., a multi view image, based on the pixel shift amount.

In particular, the renderer 130 may render the multi view image based on depth information extracted upon converting a 2-dimensional (2D) image into a 3D image. Alternatively, in response to a multi view, i.e., N views, and N depth information which correspond to the N views being input, the renderer 130 may render the multi view image based on at least one of the input N views and at least one of the N depth information. Alternatively, in response to only N views being input, the renderer 130 may extract depth information from the N views and then render the multi view image based on the extracted depth information.

For example, the renderer 130 may select a 3D image, i.e., one of the left and right eye images, as a reference view (or a center view) in order to generate a leftmost view and a rightmost view that are the basis of the multi view. In this case, the renderer 130 may generate the leftmost view and the rightmost view based on a pixel shift amount which corresponds to one of the left and right eye images selected as the reference view.

In response to the leftmost view and the rightmost view being generated, the renderer 130 may generate a plurality of interpolation views between the center view and the leftmost view and generate a plurality of interpolation views between the center view and the rightmost view, in order to render the multi view image. However, the exemplary embodiments are not limited thereto, and the renderer 130 may generate an extrapolation view by using an extrapolation technique.

Before rendering the multi view image, the renderer 130 may fill holes existing in the leftmost view and the rightmost view in order to compensate for the leftmost view and the rightmost view.

The renderer 130 may copy a value of a pixel area which corresponds to one of the leftmost view and the rightmost view to impart hole areas of the multi view image generated based on the center view, the leftmost view, and the rightmost view. In this case, the renderer 130 may perform hole-filling from a part which is close to a background. For example, in response to the renderer 130 rendering a total of 35 multi view images, the renderer 130 may fill a value of a pixel area which corresponds to the 35th view, which is a leftmost view, into hole areas of 18th through 34th views existing between a center view as 17th view and the 35th view as the leftmost view. However, the renderer 130 may perform hole-filling with respect each multi view image based on an input image.

The display 140 provides a multi view (or a multi optical view). For this, the display 140 includes a display panel 141 and a vision field divider 141.

The display panel 141 includes a plurality of pixels, each of which includes a plurality of sub pixels. Here, the sub pixels may include red (R), green (G), and blue (B) sub pixels. In other words, pixels including R, G, and B sub pixels may be arrayed in a plurality of rows and a plurality of columns in order to constitute display panel 141. The display panel 141 may be implemented as various types of displays, such as a liquid crystal display panel (LCD) panel, a plasma display panel (PDP), an organic light-emitting diode (OLED), a vacuum fluorescent display (VFD), a field emission display (FED), an electro luminescence display (ELD), etc.

The display panel 141 displays an image frame. In particular, the display panel 141 may display an image frame in which multi view images generated by the renderer 130 are sequentially and repetitively arrayed.

In response to the display panel 141 being implemented as an LCD panel, although not shown in FIG. 2, the multi view image display apparatus 100 may further include a backlight unit (not shown) that supplies backlight to the display panel 141 and a panel driver (not shown) that drives pixels of the display panel 141, according to pixel values of pixels which constitute the image frame.

The vision field divider 141 may be disposed in front of the display panel 141 to provide different views of viewing areas, i.e., a multi view. In this case, the vision field divider 142 may implemented as a lenticular lens or as a parallax barrier.

For example, the vision field divider 141 may be implemented as a lenticular lens which includes a plurality of lens areas. Therefore, the lenticular lens may refract an image displayed on the display panel 141 through the plurality of lens areas. Each of the lens areas may be formed in a size which corresponds to at least one pixel in order to differently disperse light penetrating each pixel, according to the viewing areas.

As another example, the vision field divider 142 may be implemented as a parallax barrier. The parallax barrier may be implemented as a transparent slit array including a plurality of barrier areas. Therefore, the parallax interrupts light through a slit between barrier areas in order to emit an image having a view which varies according to the viewing areas.

Although not shown in FIG. 2, the multi view image display apparatus 100 may further include different attenuation modules such as non-rectifying stereo detection, color mismatch detection, motion blur detection, etc.

According to an exemplary embodiment as described above, before rendering a multi view image, a depth estimated from an input is controlled. The reasons are as following.

First, a size of a depth that a display may express without serious deterioration of an image quality varies according to the display technology. An excessive amount of crosstalk occurring between adjacent views may limit an amount of disparity or a parallax that the display may show. Therefore, a pixel shift amount occurring in the renderer 140 may be controlled in order to accept display technologies having various depth expressions. Also, a defect in stereo matching performed by the depth estimator 110 causes a defect in a generated view. Therefore, the depth adjuster 120 may detect a lower quality scene and reduce a depth of the corresponding scene to relieve visual defects and distortion. In addition, a kind of control of a depth amount shown on the display may be provided to a user.

A method of adjusting a depth according to an exemplary embodiment will now be described in more detail with reference to the drawings.

Figure 3:
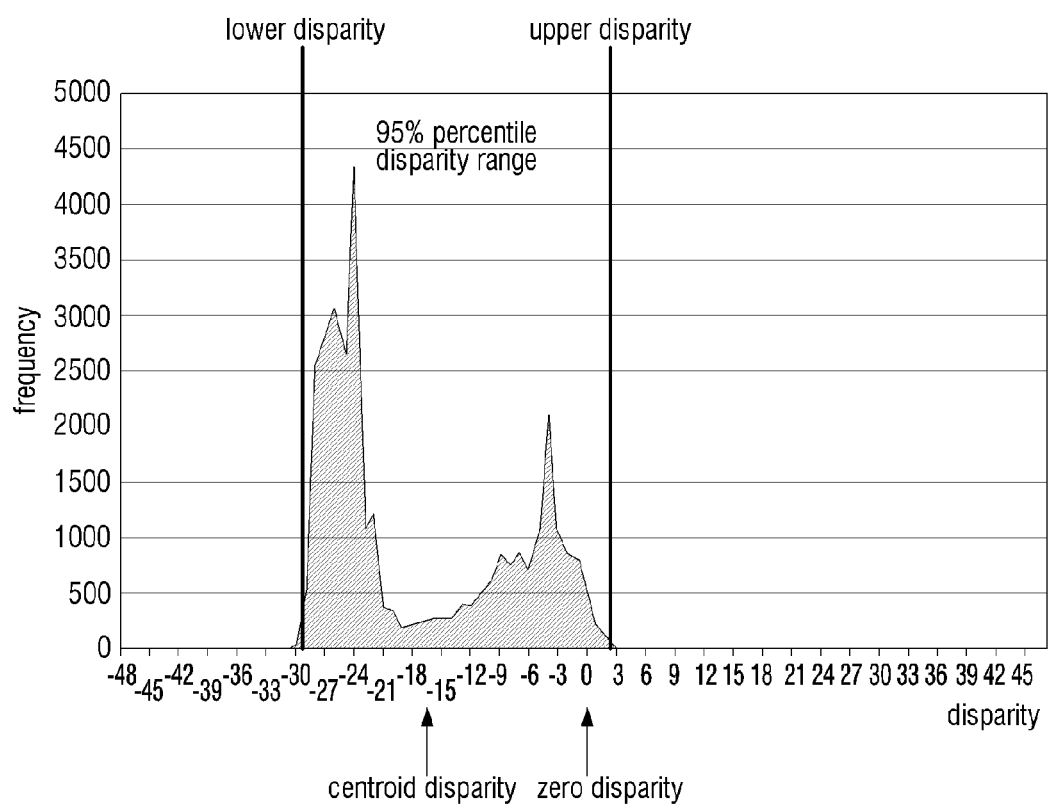
FIG. 3 is a histogram which illustrates disparity values, according to an exemplary embodiment.

FIG. 3 is a view which illustrates a histogram of a disparity value according to an exemplary embodiment.

For convenience of description, a bin size of the histogram is illustrated as one pixel in FIG. 3 but may be changed.

The histogram as shown in FIG. 3 may be formed from one image and one depth or from two images and two depths. Here, a spreading degree and a shape of the histogram vary according to contents of a stereo image. The histogram includes upper and lower disparities that determine ranges of a percentage of the total number of counted disparity values. As shown in FIG. 3, the percentage is 95%. Also, a centroid disparity value may be calculated by using various methods. One method is to calculate the centroid disparity value by using an average of all disparity values. Another method is to detect a medium point between the upper and lower disparity values. The medium point is detected to determine d_span and d_offset that will be used to control a depth.

Figure 4A:
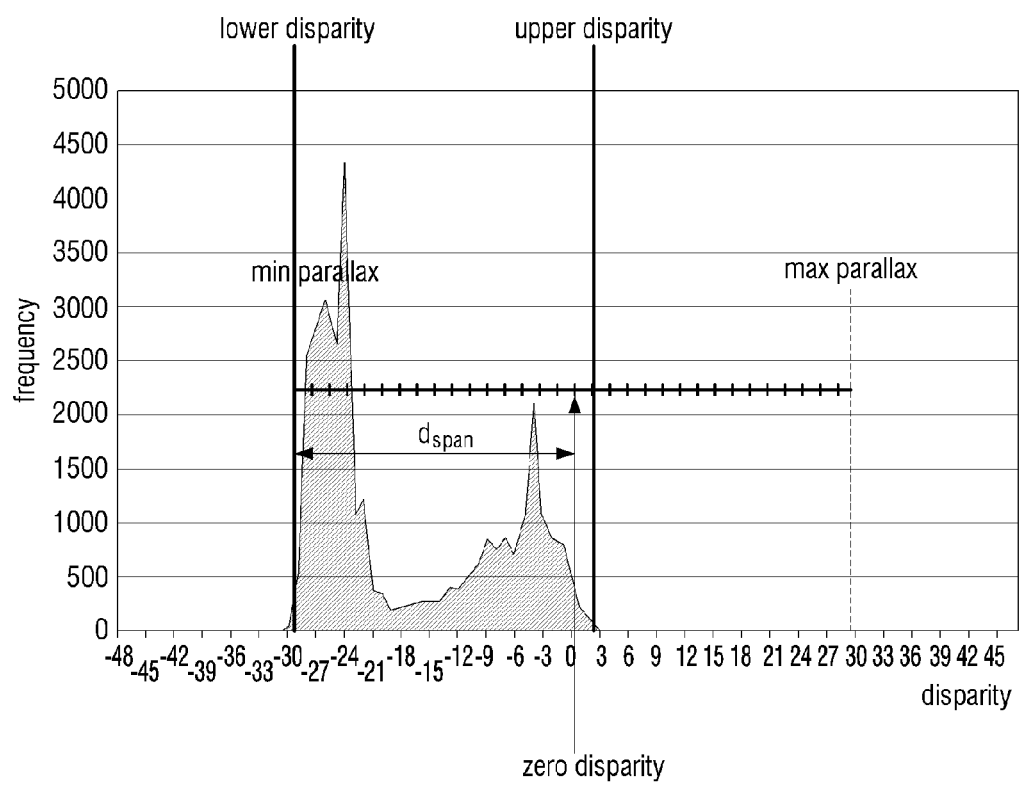
FIGS. 4A and 4B are graphs which illustrate a method of calculating a numerical value necessary for depth control, according to an exemplary embodiment.
Figure 4B:
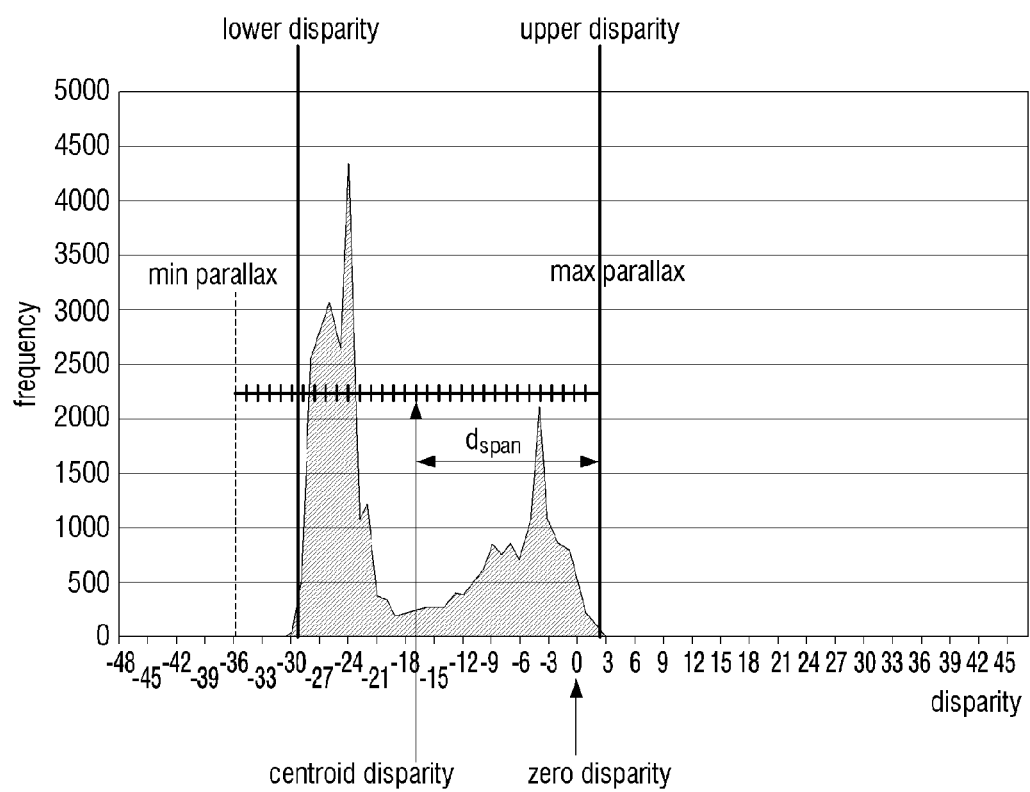

FIGS. 4A and 4B are graphs which illustrate a method of calculating a numerical value necessary for controlling a depth, according to an exemplary embodiment.

As shown in FIGS. 4A and 4B, there are two methods of detecting d_span and d_offset.

According to the first method, as shown in FIG. 4A, d_offset is set to 0, and only d_span is detected. In this case, d_span corresponds to a disparity value from 0 that ranges previously detected upper and lower disparity values. Since a lower disparity is greater than an upper disparity in FIG. 4A, d_span is allocated to a size of the lower disparity. This value determines minimum and maximum parallax values described in FIG. 4A. The minimum and maximum parallax values are values that are apart from 0 by d_span. A parallax considers an actual screen disparity that will be output from the renderer 130.

For convenience of description, a parallax is defined as a screen pixel disparity between leftmost and rightmost rendered views of a local pixel. (This definition is not technically correct but irrelevantly uses a corresponding term.) The maximum parallax value is a constant parameter that may be set by a maker or a user. A method of defining the maximum parallax value and converting a disparity value into an actual on-screen pixel disparity or parallax will now be described. In response to the maximum parallax value being set to correspond to a maximum amount of depth that may be shown as a disparity, a disparity-parallax mapping method may appropriately display all areas of an image to a viewer.

According to the second method, as shown in FIG. 4B, a disparity is calculated based on d_span. d_span is allocated to a disparity value of a centroid disparity between upper and lower disparity values. Limiting a parallax is the same as described above, and a disparity-screen parallax conversion function is determined. The second method may disperse a disparity value to more parallax values than the first method. This deepens or disperses a depth in a little more wide range.

Figure 5:
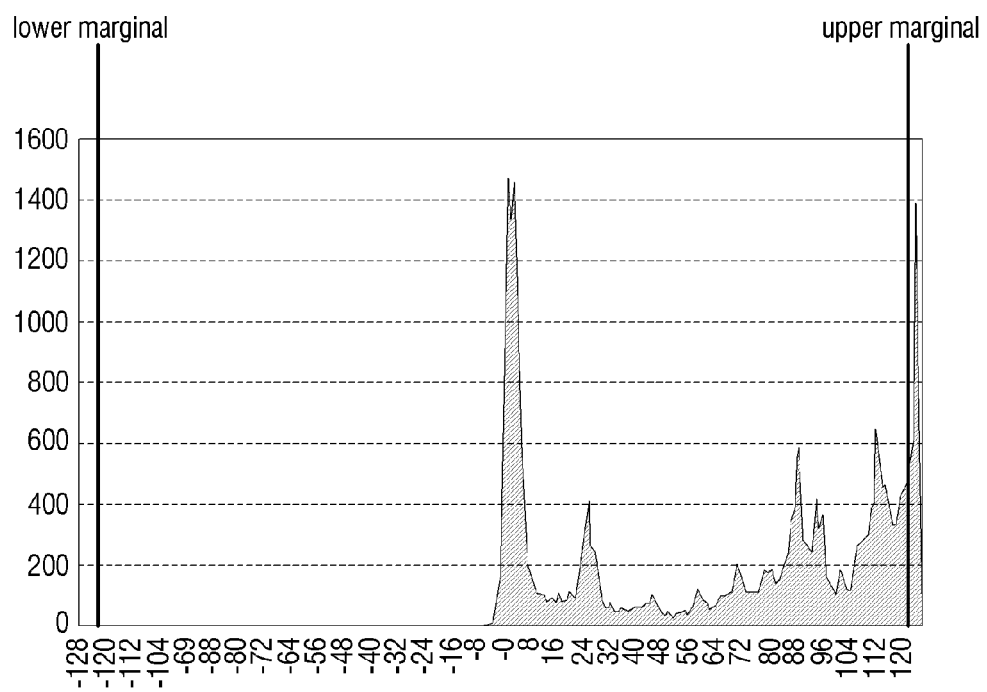
FIG. 5 is a graph which illustrates a method of calculating a threshold frequency, according to an exemplary embodiment.

FIG. 5 is a view which illustrates a method of calculating a threshold frequency according to an exemplary embodiment.

As shown in FIG. 5, at least one numerical value may be calculated from a disparity histogram. In particular, the number of samples existing in a corner area of a disparity search range is counted, and the counted number is referred to as a threshold frequency. The disparity search range is determined according to a disparity estimating algorithm or a stereo matching algorithm used for acquiring a depth image. In other words, many algorithms define a search range in which disparities are detected.

As shown in FIG. 5, the disparity search range is between −128 and 127. An outer edge of a histogram at which a threshold frequency is counted may be set to a percentage of a disparity range or the number of bins of the disparity range. This is to determine a possibility that a disparity actually existing in an image will exceed a search range limit of an algorithm.

An incorrectly estimated disparity image causes a defect in a lastly rendered view. Therefore, according to the exemplary embodiments, a depth perceived by a user may be reduced in order to potentially reduce a visual perception defect.

In particular, an attenuation constant that is an attenuation coefficient of a threshold frequency which corresponds to the outer edge of the disparity search range is determined.

Although not shown in FIG. 5, in addition to the threshold frequency, at least two numerical values that may be used by the depth adjuster 120 are calculated. One of the at least two numerical value is a periodic pattern frequency for estimating an amount of a periodic or repetitive texture existing in an image.

Most stereo matching algorithms do not calculate accurate disparities from existing periodic patterns. Therefore, there is a possibility that an incorrectly estimated disparity will exist, and a perceived depth may be reduced. A method of detecting an accurate periodic pattern is outside the scope of the exemplary embodiments, and thus a detailed description thereof is omitted.

The other one of the at least two numerical values is a quality of a matching matrix. According to a general optimization stereo matching algorithm, a quality of a matching matrix may be calculated from an MRF energy formula that basically quantifies how well a stereo image is matched. In particular, in response to the energy being high, i.e., a matching quality is low; a perceived depth may be controlled in order to be reduced.

Figure 6:
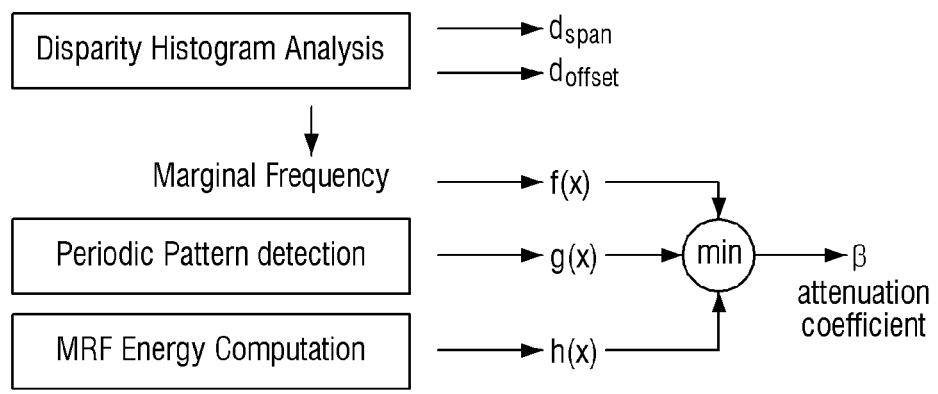
FIG. 6 is a view which illustrates a detailed operation of a depth adjuster, according to an exemplary embodiment.

FIG. 6 is a view which illustrates a detailed operation of the depth adjuster 120, according to an exemplary embodiment.

As shown in FIG. 6, the depth adjuster 120 includes three main sub modules, i.e., a disparity histogram analysis sub module, a periodic pattern detection sub module, and an MRF energy computation module. The MRF energy computation sub module may be a module that is generalized to consider a quality of an arbitrary matching matrix.

Figure 7A:
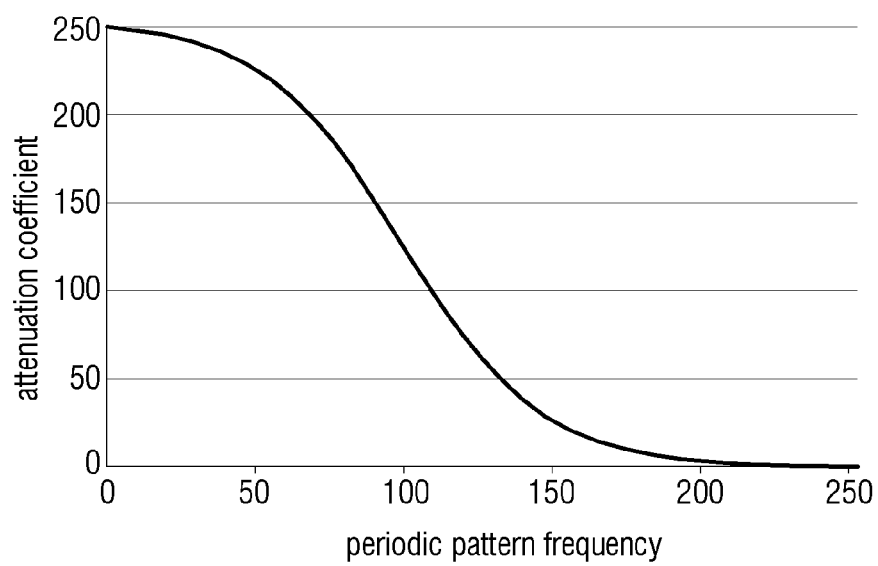
FIGS. 7A through 7C are graphs which illustrate an attenuation coefficient for reducing a depth, according to an exemplary embodiment.
Figure 7B:
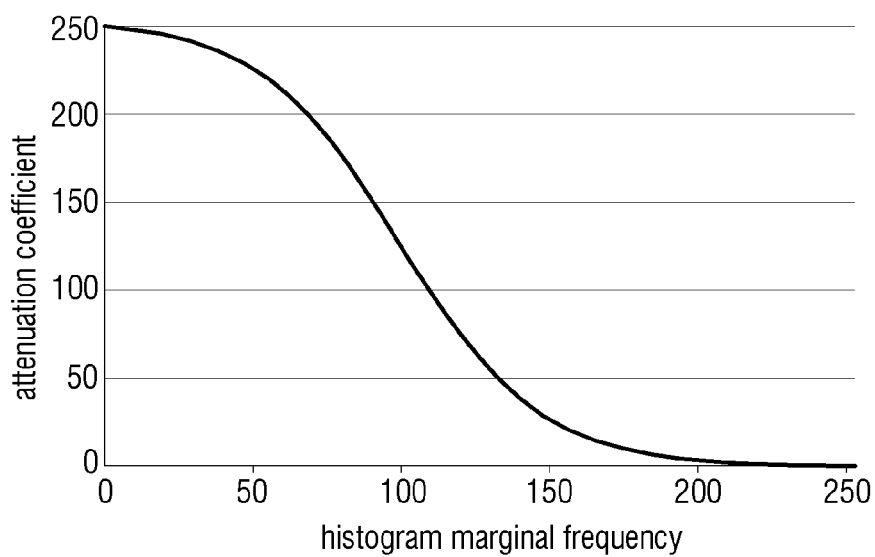
Figure 7C:
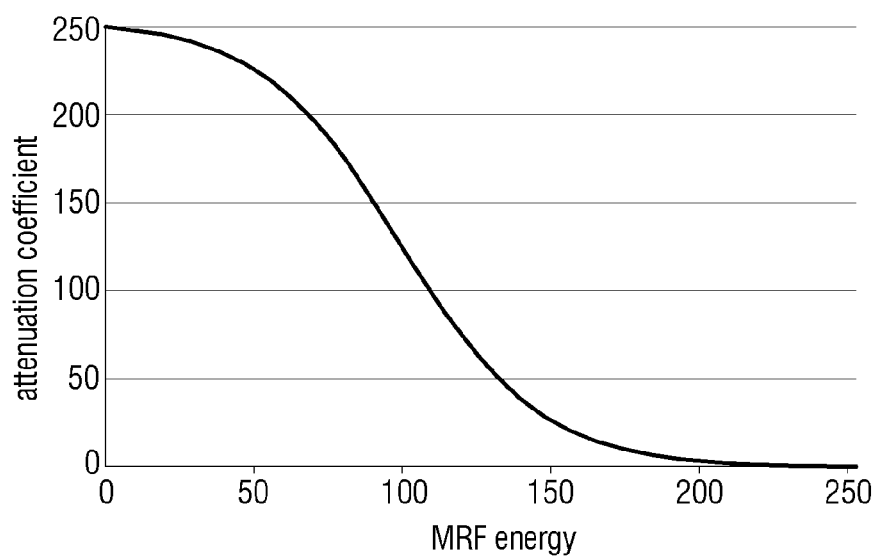

Outputs of the disparity histogram analysis sub module are d_span, d_offset, and a threshold frequency. Outputs of the periodic pattern detection sub module and the MRF energy computation sub module are respectively a periodic pattern frequency and MRF energy. Three matrixes (the threshold frequency, the periodic pattern frequency, and the MRF energy) are applied attenuation coefficients (written with f, g, and h), and a minimum value of three values is selected as attenuation coefficient β. An example of an attenuation coefficient converting the above-described matrix into an attenuation constant is illustrated in FIGS. 7A through 7C. An output of the attenuation constant is a value between 0 and 1.

The attenuation constant determines a depth reduction amount that occurs in a renderer. In other words, outputs of a depth control module (that may be 0 according to a mode) may be d_span, d_offset, and the attenuation constant β.

A method of converting a disparity into a screen parallax is illustrated in Equation 1 below:

$$\rho = \rho_{max}\alpha\beta\frac{(d - d_{offset})}{d_{span}} \quad (1)$$

wherein d denotes a local disparity of a disparity image, and p denotes a pixel shift amount occurring in a view that is generated to correspond to a corresponding disparity. Also, p_max denotes a maximum screen parallax, and outputs of a depth control module d_span, d_offset, and beta β. α denotes a view that is normalized from a center so that a distance between a view spread and leftmost and rightmost images is 1. For example, α values which correspond to various views of a display providing seven multi views are illustrated in FIG. 8.

Figure 8:
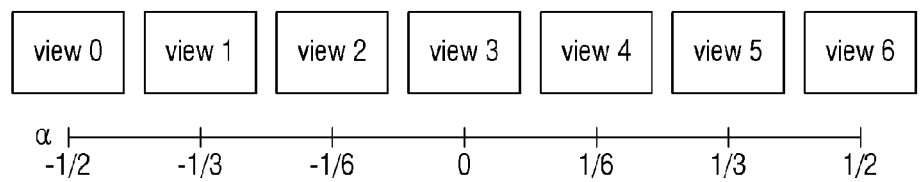
FIG. 8 is a view which illustrates a view spread, according to an exemplary embodiment.

Referring to FIG. 8, based on α value of 0 corresponding to a center view, α values of left and right multi views may be respectively −½, −⅓, −⅙, 0, ⅙, ⅓, and ½.

In Equation 1, p_max is a constant, α is a value between −½ and ½, β is a value between 0 and 1, and the last item is approximate to a range between −1 and 1.

A screen parallax p has a value between −p_max/2 and p_max/2. In other words, a maximum separate value between two arbitrary corresponding pixels between leftmost and rightmost rendering views may be approximately p_max. In case of a high threshold frequency, a high periodic pattern frequency, or high energy, β is approximate to 0, the separate value between the two corresponding pixels is approximate to 0, and a perceived depth is effectively reduced.

A kind of time filter may be applied to important numerical values used for a module, i.e., d_span, d_offs, and bβ. As an example of the time filter, case of attenuation coefficient is an exponential moving average defined in Equation 2 below:

$$\bar{\beta}_t = \gamma\beta_t + (1-\gamma)\bar{\beta}_{t-1} \quad (2)$$

γ is a weight parameter between 0 and 1. Alternatively, a scene change detecting module may be included not to apply the time filter whenever a scene is changed. For example, in case of the exponential moving average of Equation 2, γ may be set to 1 whenever a scene change is detected.

Figure 9:
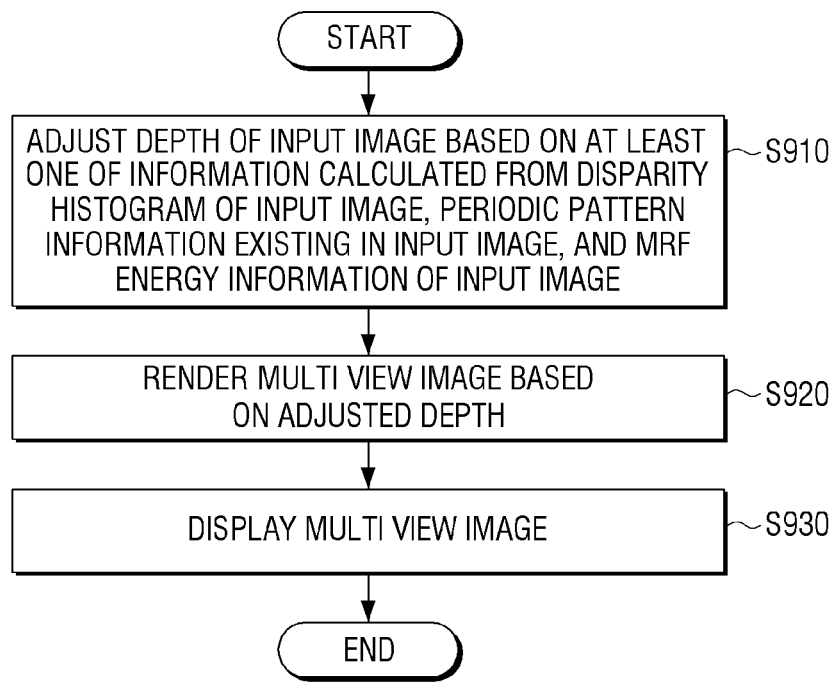
FIG. 9 is a flowchart which illustrates a method of adjusting a depth, according to an exemplary embodiment.

FIG. 9 is a flowchart which illustrates a method of adjusting a depth according to an exemplary embodiment.

Referring to FIG. 9, in operation S910, a multi view image display apparatus estimates a depth of an input image.

In operation S920, the multi view image display apparatus adjusts the estimated depth based on at least one of information calculated from a disparity histogram of the input image, periodic pattern information existing in the input image, MRF energy information of the input image.

In operation S930, the multi view image display apparatus renders a multi view image based on the adjusted depth.

In operation S940, the multi view image display apparatus displays the multi view.

In operation S920, the depth of the input image may be adjusted to be reduced based on at least one of the information calculated from the disparity histogram of the input image, the periodic pattern information existing in the input image, and the MRF energy information of the input image.

The information calculated from the disparity histogram of the input image may be threshold frequency information which corresponds to an edge area of a disparity search range in which a disparity is detected in the disparity histogram. In response to a threshold frequency exceeding a preset threshold value, the adjusted depth may be adjusted so as to be reduced in operation S920.

The periodic pattern information existing in the input image may be periodic pattern frequency information for estimating an amount of a periodic or repetitive texture existing in the input image. In response to a periodic pattern frequency exceeding a preset threshold value, the estimated depth may be adjusted to be reduced in operation S920.

The MRF energy information of the input image may be information related to energy that quantifies a matching degree of a stereo image which constitutes the input image. In response to MRF energy exceeding a preset threshold value, the estimated depth may be adjusted so as to be reduced, in operation S920.

In operation S920, a threshold frequency calculated from the disparity histogram, a periodic pattern frequency of a periodic pattern existing in the input image, and MRF energy of the input image may be converted into attenuation coefficients. Also, a minimum value of the attenuation coefficients may be determined as a depth reduction amount, and the depth of the input image may be adjusted based on the determined amount of depth reduction.

In particular, in operation S920, a pixel shift amount for rendering the multi view image may be adjusted. The pixel shift amount for rendering the multi view image may be calculated based on Equation 1, above.

According to various exemplary embodiments, a glassless 3D display apparatus may provide a user with an optimum 3D effect.

The method of adjusting the depth according to the above-described various exemplary embodiments may be implemented as a program and then provided to a display apparatus or a stereo-multi view chip.

For example, a non-transitory computer-readable medium may be provided. The non-transitory computer readable medium stores a program performing the steps of: estimating a depth of an input image; adjusting the estimated depth based on at least one of information calculated from a disparity histogram of the input image, periodic pattern information existing in the input image, and MRF energy information of the input image; and rendering a multi view image based on the adjusted depth.

The non-transitory computer-readable medium refers to a medium which does not store data for a short time such as a register, a cache memory, a memory, or the like but rather semi-permanently stores data and is readable by a device. In particular, the above-described applications or programs may be stored and provided on a non-transitory computer readable medium such as a CD, a DVD, a hard disk, a Blu-ray Disc™, a universal serial bus (USB), a memory card, a ROM, or the like.

The foregoing exemplary embodiments and advantages are merely exemplary and are not to be construed as limiting. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A multi view image display apparatus comprising:
a depth estimator configured to estimate a depth of an input image;
a depth adjuster configured to adjust the estimated depth;
a renderer configured to render a multi view image based the adjusted depth; and
a display configured to display the rendered multi view image,
wherein the depth adjuster is configured to adjust the estimated depth based on a minimum value of at least one of information calculated from a disparity histogram of the input image, periodic pattern information existing in the input image, and Markov random fields (MRF) energy information of the input image, and
wherein the depth adjuster is configured to convert a threshold frequency calculated from the disparity histogram, the periodic pattern information, and the MRF energy information into attenuation coefficients, to determine a minimum value of the attenuation coefficients as a depth reduction amount, and to adjust the depth of the input image based on the determined amount of depth reduction.

2. The multi view image display apparatus of claim 1, wherein the depth adjuster is configured to adjust the estimated depth to reduce the estimated depth based on at least one of the information calculated from the disparity histogram of the input image, the periodic pattern information existing in the input image and the MRF energy information of the input image.

3. The multi view image display apparatus of claim 2, wherein the depth adjuster is configured to adjust the estimated depth based on at least the minimum value of said information calculated from the disparity histogram of the input image, wherein the information calculated from the disparity histogram of the input image is threshold frequency information which corresponds to an edge area of a disparity search range in which a disparity is detected from the disparity histogram, and
wherein in response to the threshold frequency information exceeding a preset threshold value, the depth adjuster adjusts the adjusted depth in order to reduce the estimated depth.

4. The multi view image display apparatus of claim 2, wherein the depth adjuster is configured to adjust the estimated depth based on at least the periodic pattern information existing in the input image, which is periodic pattern frequency information to estimate an amount of a periodic or repetitive texture existing in the input image, and
wherein in response to the periodic pattern frequency information exceeding a preset threshold value, the depth adjuster adjusts the estimated depth to reduce the estimated depth.

5. The multi view image display apparatus of claim 2, wherein the depth adjuster is configured to adjust the MRF energy information of the input image which is information related to energy that quantifies a matching degree of a stereo image constituting the input image,
wherein in response to the MRF energy information exceeding a preset threshold value, the depth adjuster adjusts the estimated depth in order to reduce the estimated depth.

6. The multi view image display apparatus of claim 1, wherein the depth adjuster is configured to adjust a pixel shift amount for rendering the multi view image.

7. The multi view image display apparatus of claim 6, wherein the depth adjuster is configured to calculate the pixel shift amount for rendering the multi view image based on the Equation below:

$$p = p_{max}\alpha\beta\frac{(d - d_{offset})}{d_{span}}$$

wherein p denotes a pixel shift amount occurring in a view that is generated to correspond to a disparity, d denotes a local disparity of a disparity image, p_max denotes a maximum screen parallax, d_span and d_offset are values calculated from the disparity histogram, β denotes the threshold frequency, a periodic pattern frequency, and a minimum value of the MRF energy information, and a denotes a view distance that is normalized from a center so that a distance between leftmost and rightmost images is 1.

8. The multi view image display apparatus of claim 1, wherein the depth adjuster comprises:
a disparity histogram analysis component configured to calculate a d_span, a d_offset, and a minimum value of a threshold frequency,
a periodic pattern detection component configured to calculate a periodic pattern frequency, and
a MRF energy computation component configured to calculate the MRF energy information,
wherein the depth adjuster selects a smallest value of the minimum value of a threshold frequency, the periodic pattern frequency, and the MRF energy information, as an attenuation coefficient to reduce the estimated depth.

9. A method of controlling a multi view image display apparatus, the method comprising:
estimating a depth of an input image;
adjusting the estimated depth based on a minimum value of at least one of information calculated from a disparity histogram of the input image, periodic pattern information existing in the input image, and Markov random fields (MRF) energy information of the input image;
rendering a multi view image based on the adjusted depth; and
displaying the rendered multi view image,
wherein the adjusting of the estimated depth comprises:
converting the disparity histogram, the periodic pattern information, and the MRF energy information into attenuation coefficients, determining a minimum value of the attenuation coefficients as a depth reduction amount, and adjusting the depth of the input image based on the determined depth reduction amount.

10. The method of claim 9, wherein the depth of the input image is adjusted to be reduced based on the information calculated from the disparity histogram of the input image, the periodic pattern information existing in the input image, and the MRF energy information of the input image.

11. The method of claim 10, wherein the information calculated from the disparity histogram of the input image is threshold frequency information which corresponds to an edge area of a disparity search range in which a disparity is detected from the disparity histogram,
wherein in response to the threshold frequency information exceeding a preset threshold value, the adjusted depth is adjusted in order to be reduced.

12. The method of claim 10, wherein the periodic pattern information existing in the input image is periodic pattern frequency information to estimate an amount of a periodic or repetitive texture existing in the input image, wherein in response to the periodic pattern frequency information exceeding a preset threshold value, the estimated depth is adjusted in order to be reduced.

13. The method of claim 10, wherein the MRF energy information of the input image is information related to energy that quantifies a matching degree of a stereo image which constitutes the input image, wherein in response to the MRF energy information exceeding a preset threshold value, the estimated depth is adjusted in order to be reduced.

14. The method of claim 9, wherein the adjusting of the estimated depth comprises: adjusting a pixel shift amount for rendering the multi view image.

15. The method of claim 14, wherein the pixel shift amount for rendering the multi view image is calculated based on Equation below:

$$\rho = \rho_{max}\alpha\beta\frac{(d - d_{offset})}{d_{span}}$$

wherein p denotes a pixel shift amount occurring in a view that is generated to correspond to a disparity, d denotes a local disparity of a disparity image, p_max denotes a maximum screen parallax, d_span and d_offset are values calculated from the disparity histogram, β denotes a minimum value of the threshold frequency, a periodic pattern frequency, and the MRF energy information, and a denotes a view distance that is normalized from a center so that a distance between leftmost and rightmost images is 1.

16. A multi view image display apparatus comprising:

a depth adjuster configured to adjust an estimated depth of an input image; and a renderer configured to render a multi view image based on the adjusted estimated depth;

wherein the depth adjuster is configured to adjust the estimated depth to reduce the estimated depth based on a minimum value of at least one of information calculated from a disparity histogram of the input image, periodic pattern information existing in the input image, and Markov random fields (MRF) energy information of the input image, wherein the depth adjuster is configured to adjust the estimated depth by converting a threshold frequency calculated from the disparity histogram, the periodic pattern information, and the MRF energy information into attenuation coefficients, by determining a minimum value of the attenuation coefficients as a depth reduction amount, and by adjusting the depth of the input image based on the determined depth reduction amount.

17. The multi view image display apparatus of claim 16, further comprising a display configured to display the rendered multi view image.

18. The multi view image display apparatus of claim 16, further comprising a depth estimator configured to estimate the depth of the input image.

19. The multi view image display apparatus of claim 16, wherein the information calculated from the disparity histogram of the input image is threshold frequency information which corresponds to an edge area of a disparity search range in which a disparity is detected from the disparity histogram, wherein in response to the threshold frequency information exceeding a preset threshold value, the depth adjuster adjusts the adjusted depth in order to reduce the estimated depth.

* * * * *